United States Patent
Rickett et al.

(10) Patent No.: US 11,237,284 B2
(45) Date of Patent: Feb. 1, 2022

(54) SINGLE STREAMER DEGHOSTING WITH EXTENDED MODEL SPACE

(71) Applicant: Schlumberger Technology Corporation, Sugar Land, TX (US)

(72) Inventors: James Rickett, Cambridge (GB); Philippe Caprioli, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 819 days.

(21) Appl. No.: 15/559,416

(22) PCT Filed: Mar. 21, 2016

(86) PCT No.: PCT/US2016/023391
§ 371 (c)(1),
(2) Date: Sep. 18, 2017

(87) PCT Pub. No.: WO2016/154104
PCT Pub. Date: Sep. 29, 2016

(65) Prior Publication Data
US 2018/0081072 A1    Mar. 22, 2018

Related U.S. Application Data

(60) Provisional application No. 62/136,042, filed on Mar. 20, 2015.

(51) Int. Cl.
*G01V 1/36* (2006.01)
*G01V 1/38* (2006.01)

(52) U.S. Cl.
CPC ............... *G01V 1/36* (2013.01); *G01V 1/364* (2013.01); *G01V 1/38* (2013.01); *G01V 2210/56* (2013.01)

(58) Field of Classification Search
CPC ................................. G01V 1/36; G01V 1/364
See application file for complete search history.

(56) References Cited

U.S. PATENT DOCUMENTS

| 7,957,906 | B2 | 6/2011 | Turnbull |
| 8,699,297 | B2 | 4/2014 | Ozdemir et al. |
| 2008/0033655 | A1 | 2/2008 | Ozbek et al. |
| 2008/0186804 | A1 | 8/2008 | Amundsen et al. |

(Continued)

FOREIGN PATENT DOCUMENTS

| EP | 2108980 A2 | 10/2009 |
| WO | 2014150897 A2 | 9/2014 |

OTHER PUBLICATIONS

Guidelines for the Evaluation of Petroleum Reserves and Resources, Society of Petroleum Engineers, ISBN 978-1-55563-105-5, pp. 1-141 (Year: 2001).*

(Continued)

*Primary Examiner* — Lisa E Peters
(74) *Attorney, Agent, or Firm* — Michael Guthrie

(57) ABSTRACT

A method for deghosting marine seismic streamer data includes receiving the marine seismic data recorded from a single streamer. A representation of an upgoing wavefield in the marine seismic data is defined. The representation of the upgoing wavefield includes a first wave component in a plane and a second wave component that is perpendicular to the plane. A linear system is built that models a wavefield using the representation. The wavefield includes the upgoing wavefield and a downgoing ghost wavefield. The upgoing wavefield is estimated, within the representation, by inverting the linear system.

20 Claims, 8 Drawing Sheets

(56) References Cited

U.S. PATENT DOCUMENTS

| | | | |
|---|---|---|---|
| 2008/0279043 A1 | 11/2008 | Soubaras | |
| 2009/0067285 A1* | 3/2009 | Robertsson | G01V 1/3808 367/24 |
| 2009/0122641 A1 | 5/2009 | Hillesund et al. | |
| 2009/0238036 A1* | 9/2009 | Robertsson | G01V 1/3808 367/24 |
| 2011/0176384 A1* | 7/2011 | Baras | G01V 1/28 367/21 |
| 2011/0242937 A1* | 10/2011 | Sollner | G01V 1/325 367/38 |
| 2013/0163376 A1* | 6/2013 | Poole | G01V 1/28 367/24 |
| 2013/0182532 A1* | 7/2013 | Ferber | G01V 1/364 367/21 |
| 2013/0182536 A1* | 7/2013 | Vassallo | G01V 1/364 367/24 |
| 2014/0050049 A1* | 2/2014 | Kitchenside | G01V 1/36 367/24 |
| 2015/0003689 A1 | 1/2015 | Sheiman et al. | |

OTHER PUBLICATIONS

International Search Report and Written Opinion for the equivalent International patent application PCT/US2016/023391 dated Jun. 29, 2016.

International Preliminary Report on Patentability for the equivalent International patent application PCT/US2016/023391 dated Oct. 5, 2017.

Ping Wang et al., "3D Joint deghosting and crossline interpolation for marine single-component streamer data", Seg Technical Program Expanded Abstracts, Aug. 5, 2014, pp. 3594-3598.

J.E. Rickett et al., "Slanted-streamer data-adaptive deghosting with local plane waves", proceedings of the 76th EAGE conference Exhibition, Jun. 16, 2014, pp. 1-5.

Extended European Search Report issued in the related EP Application 16769488.4, dated Nov. 21, 2018 (9 pages).

Communication pursuant to Article 94(3) EPC dated Oct. 13, 2021 in corresponding European Patent application No. 16769488.4 (5 pages).

* cited by examiner

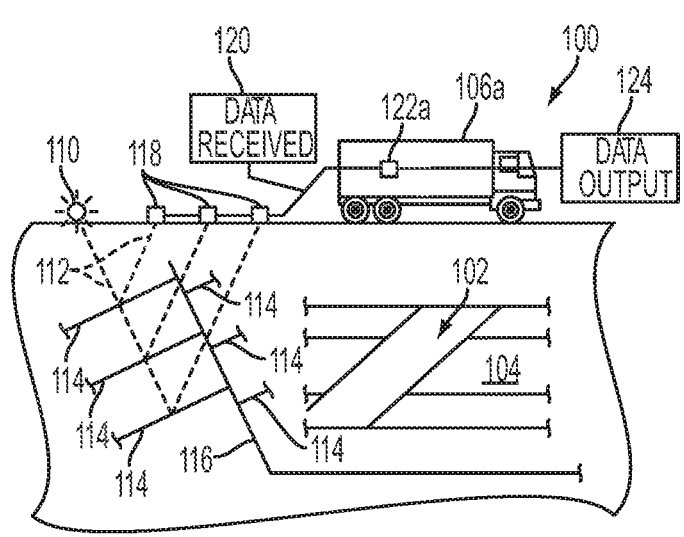
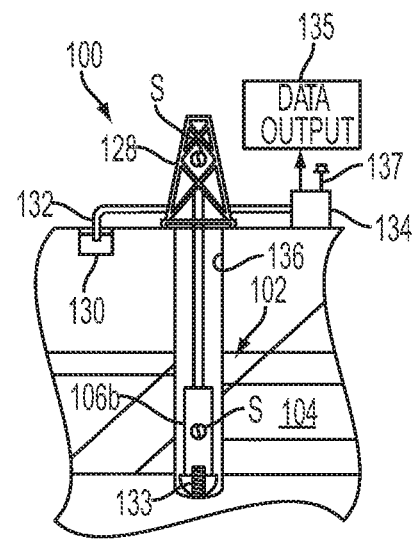
FIG. 1A  FIG. 1B
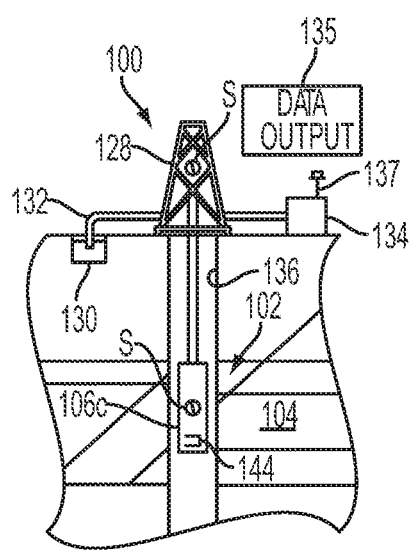
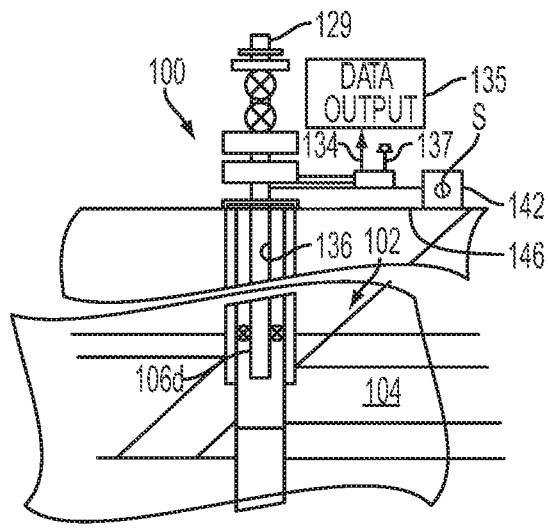
FIG. 1C  FIG. 1D

SINGLE STREAMER DEGHOSTING WITH EXTENDED MODEL SPACE

CROSS-REFERENCE TO RELATED APPLICATION

This application claims priority to U.S. Provisional Patent Application having Ser. No. 62/136,042 filed on Mar. 20, 2015. The entirety of this priority provisional patent application is incorporated by reference herein.

BACKGROUND

Single streamer deghosting ("SSD") is often based on inverting the linear relationship between an upward going wavefield and a total wavefield on a frequency-by-frequency basis under assumptions of a two-dimensional ("2D") wave and a flat sea surface. This algorithm accounts for arbitrary receiver depths and positions along the cable. Receiver sampling satisfies the Nyquist criterion for waves propagating at the water velocity.

The algorithm provides a fast and effective method for deghosting in many situations; however, it experiences stability problems at low frequencies, and has a deterministic ghost model that is unable to adapt to out-of-plane propagation effects and errors in the receiver depths. In addition, the single-frequency approach of SSD has inherent shortcomings. For example, it generally cannot recover from a deep ghost notch if the notch cuts across the traces at a single frequency, and it uses notch diversity within the spatial window in order to perform effectively.

SUMMARY

Embodiments of the disclosure may provide a method for deghosting marine seismic streamer data. The method includes receiving the marine seismic data recorded from a single streamer. A representation of an upgoing wavefield in the marine seismic data is defined. The representation of the upgoing wavefield includes a first wave component in a plane and a second wave component that is perpendicular to the plane. A linear system is built that models a wavefield using the representation. The wavefield includes the upgoing wavefield and a downgoing ghost wavefield. The upgoing wavefield is estimated, within the representation, by inverting the linear system.

In an embodiment, the representation of the upgoing wavefield is defined on a sinusoidal basis.

In an embodiment, the representation of the upgoing wavefield is defined such that spatial samples are synthesized from basis coefficients with a linear operator.

In an embodiment, the representation of the upgoing wavefield is defined in terms of temporal frequency, inline wavenumber sampling, and crossline wavenumber sampling.

In an embodiment, defining the representation of the upgoing wavefield includes determining a wavenumber sampling for inline propagation based on receiver sampling along a cable, and determining a crossline sampling such that a ghost delay is adequately sampled by the Nyquist criteria.

In an embodiment, the method also includes generating a model vector that parameterizes the upgoing wavefield at a surface of the sea, wherein the model vector parameterizes the upgoing wavefield in terms of one or more horizontal spatial Fourier components in a direction of the single streamer.

In an embodiment, building the linear system includes calculating elements of a matrix that links the upgoing wavefield and the downgoing ghost wavefield.

In an embodiment, the method also includes estimating the downgoing ghost wavefield using the upgoing wavefield, and removing the downgoing ghost wavefield from a wavefield as noise.

In an embodiment, the upgoing wavefield is estimated at either a surface of the sea or at a datum of a receiver of the marine seismic data.

In an embodiment, the method also includes performing a drilling action using the estimated upgoing wavefield.

Embodiments of the disclosure may also provide a non-transitory computer-readable medium. The medium stores instructions that, when executed by a processor of a computing system, cause the computing system to perform operations. The operations include receiving the marine seismic data recorded from a single streamer. A representation of an upgoing wavefield in the marine seismic data is defined. The representation of the upgoing wavefield includes a first wave component in a plane and a second wave component that is perpendicular to the plane. A linear system is built that models a wavefield using the representation. The wavefield includes the upgoing wavefield and a downgoing ghost wavefield. The upgoing wavefield is estimated, within the representation, by inverting the linear system.

In an embodiment, the representation of the upgoing wavefield is defined on a sinusoidal basis.

In an embodiment, the representation of the upgoing wavefield is defined such that spatial samples are synthesized from basis coefficients with a linear operator.

In an embodiment, the representation of the upgoing wavefield is defined in terms of temporal frequency, inline wavenumber sampling, and crossline wavenumber sampling.

In an embodiment, defining the representation of the upgoing wavefield includes determining a wavenumber sampling for inline propagation based on receiver sampling along a cable, and determining a crossline sampling such that a ghost delay is adequately sampled by the Nyquist criteria.

In an embodiment, the operations also include generating a model vector that parameterizes the upgoing wavefield at a surface of the sea, wherein the model vector parameterizes the upgoing wavefield in terms of one or more horizontal spatial Fourier components in a direction of the single streamer.

Embodiments of the disclosure may also provide a computing system. The computing system includes a processor a memory system. The memory system includes a non-transitory computer-readable medium storing instructions that, when executed by the processor, causes the computing system to perform operations. The operations include receiving the marine seismic data recorded from a single streamer. A representation of an upgoing wavefield in the marine seismic data is defined. The representation of the upgoing wavefield includes a first wave component in a plane and a second wave component that is perpendicular to the plane. A linear system is built that models a wavefield using the representation. The wavefield includes the upgoing wavefield and a downgoing ghost wavefield. The upgoing wavefield is estimated, within the representation, by inverting the linear system.

In an embodiment, building the linear system includes calculating elements of a matrix that links the upgoing wavefield and the downgoing ghost wavefield.

In an embodiment, the method also includes estimating the downgoing ghost wavefield using the upgoing wavefield, and removing the downgoing ghost wavefield from a wavefield as noise.

In an embodiment, the upgoing wavefield is estimated at either a surface of the sea or at a datum of a receiver of the marine seismic data.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

FIGS. 1A, 1B, 1C, 1D, 2, 3A, and 3B illustrate simplified, schematic views of an oilfield and its operation, according to an embodiment.

DETAILED DESCRIPTION

Figure 2:
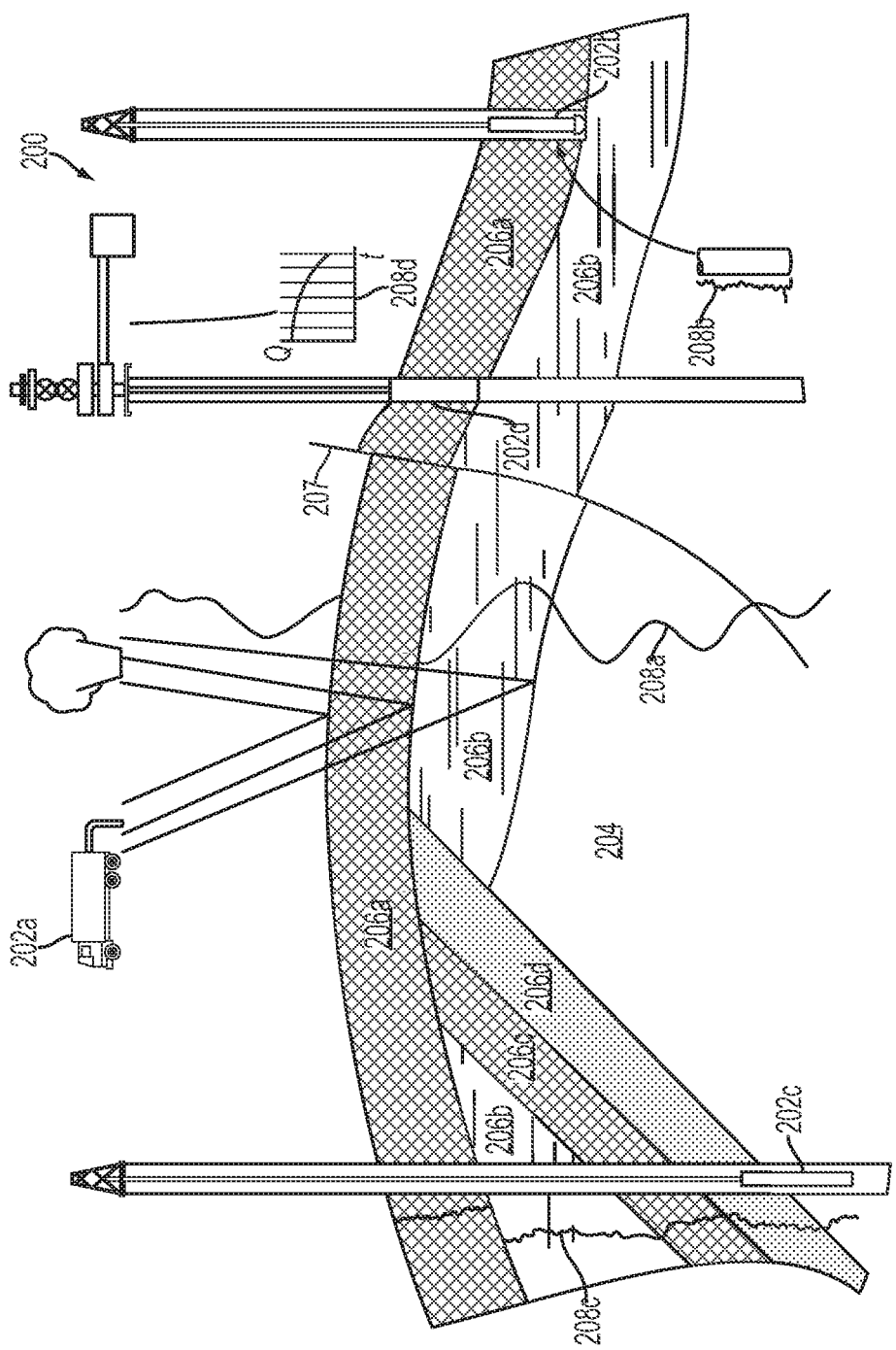

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both, objects or steps, respectively, but they are not to be considered the same object or step.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106.1, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106.3 suspended by rig 128 and into wellbore 136 of FIG. 1B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1A-1D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively; however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that typically provides a resistivity or other measurement of the formation at various depths.

A production decline curve or graph 208.4 is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208.1 from data acquisition tool 202.1 is used by a geophysicist to determine characteristics of the subterranean formations and features. The core data shown in static plot 208.2 and/or log data from well log 208.3 are typically used by a geologist to determine various characteristics of the subterranean formation. The production data from graph 208.4 is typically used by the reservoir engineer to determine fluid flow reservoir characteristics. The data analyzed by the geologist, geophysicist and the reservoir engineer may be analyzed using modeling techniques.

Figure 3A:
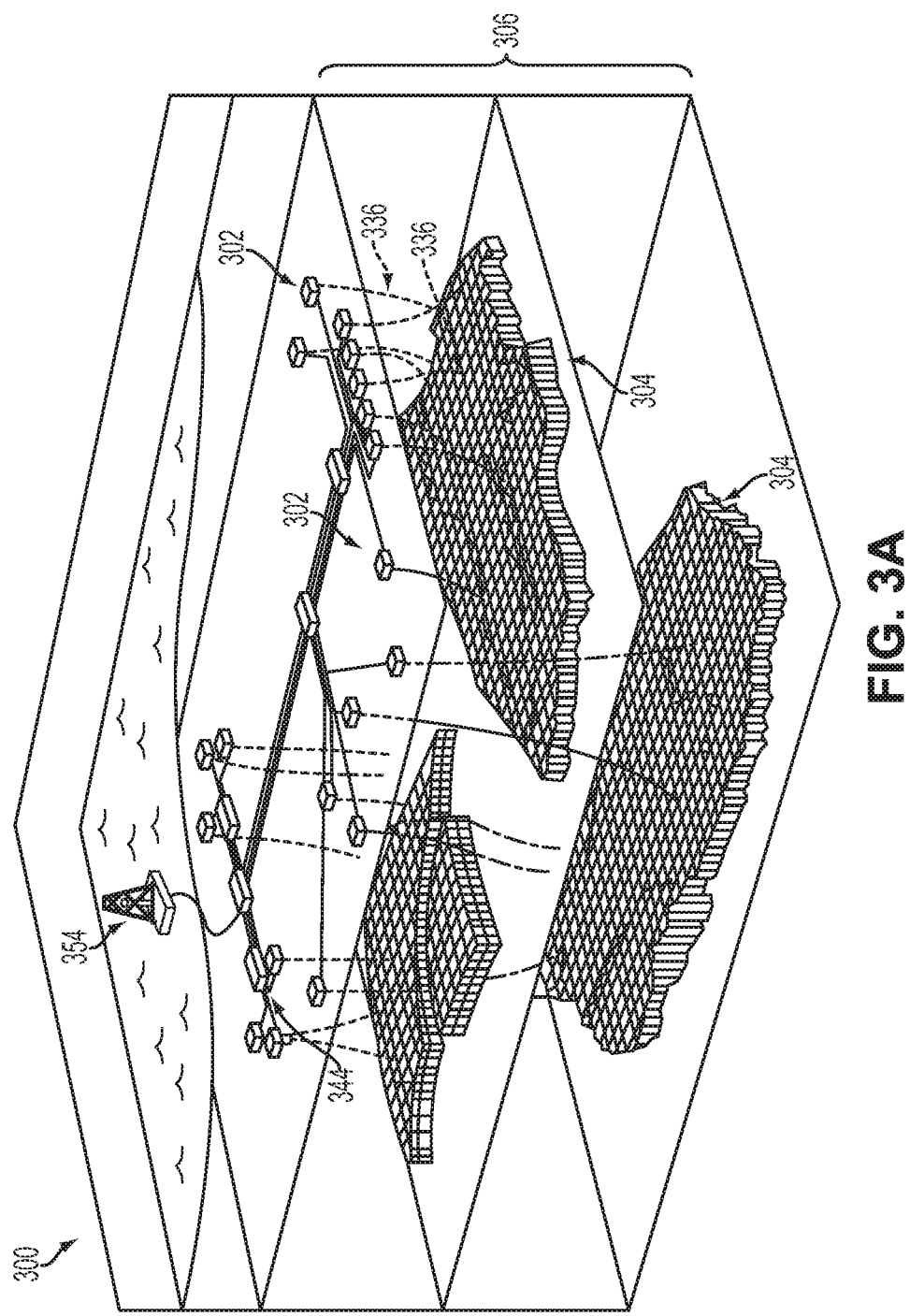

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
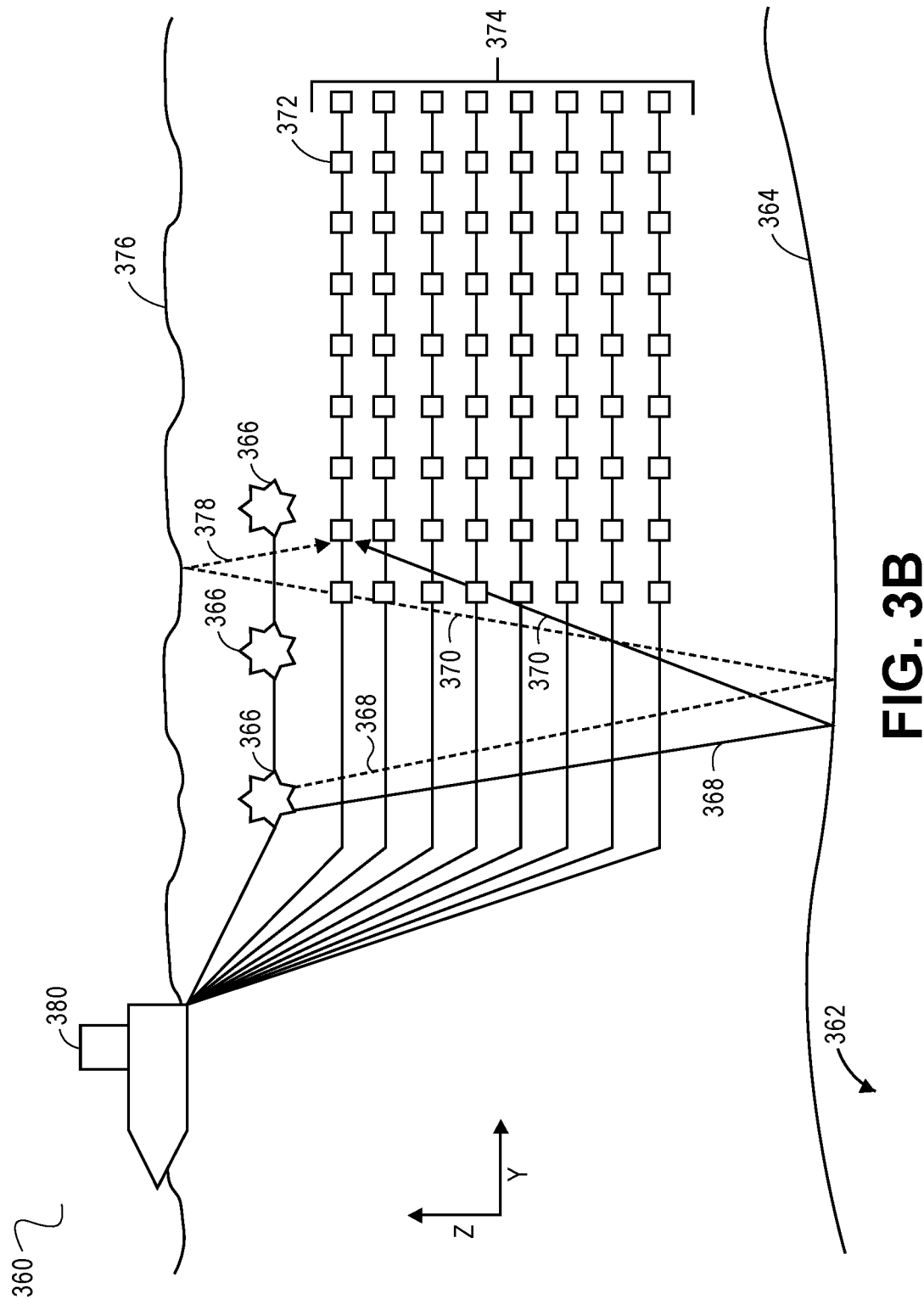

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Typically, marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

In one embodiment, variable-depth single marine streamer deghosting decomposes an upgoing wavefield in terms of its wavenumber along a single horizontal coordinate. This may be done on a frequency-by-frequency basis. A linear system may then be built that models the ghost operator, assuming that there is no propagation orthogonal to this coordinate axis. The upgoing wavefield may then be estimated by inverting this linear system. If the out-of-plane propagation is greater than a predetermined amount, the inverse of the linear system may become unstable, and damping may be applied.

Figure 4:
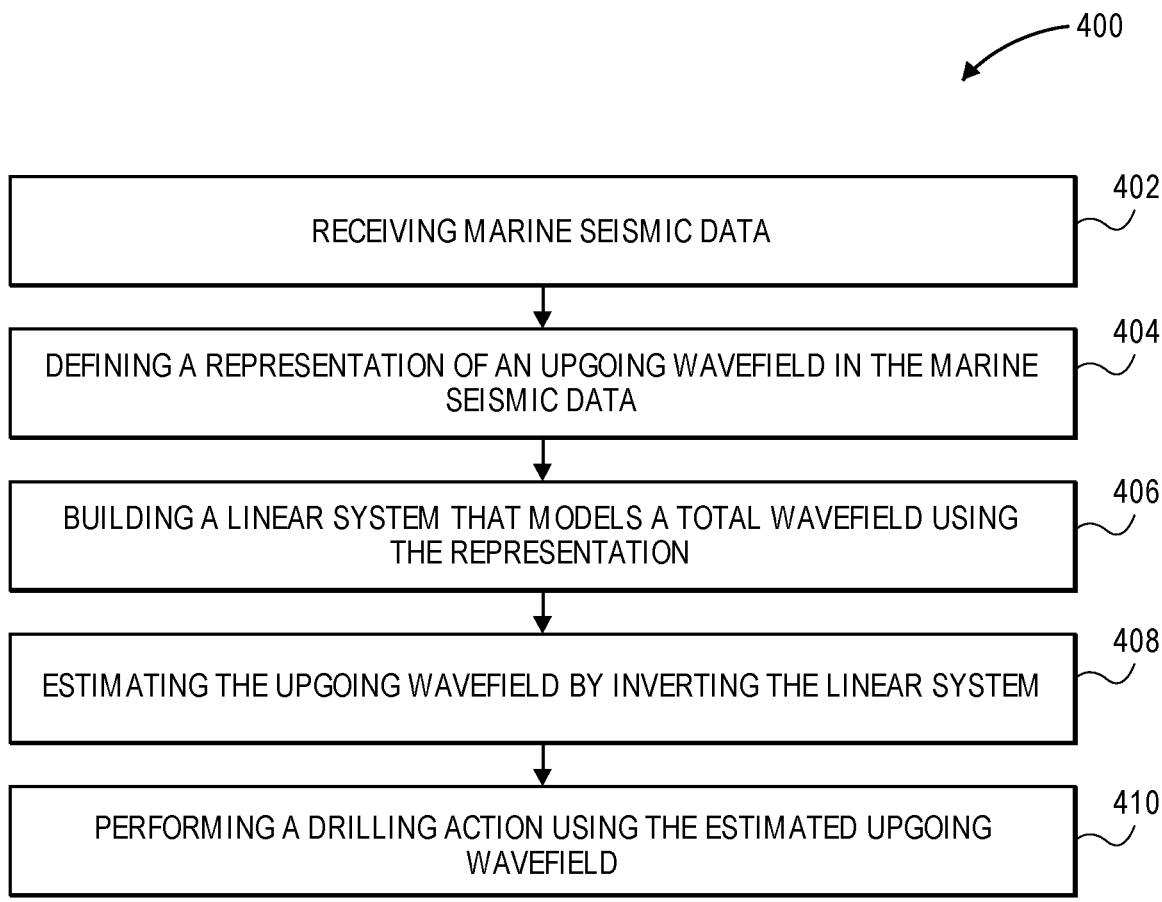
FIG. 4 illustrates a flowchart of a method for deghosting marine seismic streamer data, according to an embodiment.

FIG. 4 illustrates a flowchart of a method 400 for deghosting marine seismic streamer data, according to an embodiment. The method 400 may begin by receiving marine seismic data, as at 402. In at least one embodiment, marine seismic data may be collected from seismic waves that propagated in/through the sea, the subterranean formation, or a combination thereof. The marine seismic data may be recorded from a single streamer. As used herein, a "streamer" refers to a surface marine cable including one or more seismic receivers, such as hydrophones. The cable may be buoyant, and may include one or more electrical wires that connect the hydrophones and relay seismic data therefrom to a recording seismic vessel.

The method 400 may then include defining or decomposing a representation of an upgoing wavefield in the marine seismic data, as at 404. As used herein, a "representation" defines the parameters over which the wavefield is defined or decomposed. As used herein, an "upgoing wavefield" refers to the part of the wavefield that is incident on the streamer from below, as opposed to the "downgoing wavefield" that contains the ghost reflections that have reflected from the ocean surface. The representation of the upgoing wavefield may include a first wave component in a plane and a second wave component that is orthogonal (i.e., perpendicular) to the plane. In other words, the wavefield parameterization may be expanded to include wave-components that have an orthogonal (i.e., perpendicular) component to their propagation. This provides a different method of stabilizing the deghosting process. As used herein, a "wave component" refers to a part of the wavefield that is propagating in a particular direction.

The method 400 may also include building a linear system that models a total wavefield using the representation of the upgoing wavefield, as at 406. As used herein, a "linear system" refers to a model linking inputs and outputs via a mapping that satisfies the well-known properties of linearity (i.e., both additivity and homogeneity of degree 1). The total wavefield may include the upgoing wavefield and a downgoing ghost wavefield. As used herein, a "ghost operator" refers to a linear operator that simulates the effect of reflecting from the free surface, and so models the downgoing wavefield from a known incident upgoing wavefield. The method 400 may also include determining or estimating the upgoing wavefield, within the representation, by inverting the linear system, as at 408.

The method 400 may also include performing a drilling action using the estimated upgoing wavefield, as at 410. The drilling action may include drilling a wellbore at a predetermined location in response to the estimated upgoing wavefield. In another embodiment, the drilling action may include varying a trajectory of a downhole tool to vary a trajectory of the wellbore in response to the estimated upgoing wavefield. In another embodiment, the drilling action may include varying a weight-on-bit ("WOB") of the downhole tool at one or more locations in the subterranean formation in response to the estimated upgoing wavefield. In another embodiment, the drilling action may include varying a flow rate of fluid being pumped into the wellbore in response to the estimated upgoing wavefield. In another embodiment, the drilling action may include varying a type (e.g., composition) of the fluid being pumped into the wellbore in response to the estimated upgoing wavefield. In another embodiment, the drilling action may include measuring one or more parameters in the subterranean formation using the downhole tool in response to the estimated upgoing wavefield. The downhole tool may be or include a measurement-while-drilling ("MWD") tool, a logging-while-drilling ("LWD") tool, or the like. The parameters measured by the downhole tool may be or include pressure, temperature, wellbore trajectory, resistivity, porosity, sonic velocity, gamma ray, or a combination thereof.

Original SSD Algorithm

SSD works on single-frequency slices of data (e.g., seismic data), and looks to define or decompose the wavefield, e.g., as part of the block 404, using a sinusoidal basis, such that spatial samples, $f_j$, are synthesized from basis coefficients $F_l$ with a linear operator defined by:

$$f_j = \sum_{l=0}^{N_k-1} F_l e^{-ik_l x_j} \tag{1}$$

where $N_k$ is the number of basis functions, and $x_j$ is the location of the sample point. The wavenumber sampling is regular between $k_{max}$, with $$k_{max} = \frac{\omega \sin\theta_{max}}{c},$$

where ω is the angular frequency in the data, $\theta_{max}$ is the maximum emergence angle, and c is the speed of sound in the water column. The x-axis samples do not have to be regularly spaced.

After a Fast Fourier Transform ("FFT") over the time axis, for each angular frequency in the data, ω, a model vector, m, of length, $N_m$, may be defined that parameterizes the upgoing wavefield at the sea-surface in terms of its horizontal spatial Fourier components in the direction of the streamer:

$$m_j = P^-(k=k_j, z=0) \quad (2)$$

where P is the wavefield, and k is horizontal wavenumber in the plane of the streamer.

The total wavefield at depth z, may be the sum of the upgoing and downgoing wavefields after backward and forward extrapolation respectively.

$$P^{tot}(k_j, z) = (e^{-iq_j z} \alpha e^{iq_j z}) P^-(k_j, 0) \quad (3)$$

where $P^{tot}$ is the total wavefield, $$q_j = \sqrt{\frac{\omega^2}{c^2} \frac{k_j^2}{\cos^2 \theta}}$$

is the vertical component of the wavenumber vector, c is the sound speed in the water column, θ is the angle between the streamer azimuth and the azimuth of propagation, and α is the reflection coefficient of the free surface. The free-surface reflection coefficient, α, may be set close to 1; although, if the sea surface is rough, a lower value may be used. In practice, α may be used as a stabilization parameter. The phase of the output may depend on the value chosen. As such, stabilization may be achieved with the white noise parameter, ε, below.

A Discrete Fourier Transform ("DFT") may then be used to extract the wavefield at the horizontal location of the receiver to give:

$$p^{tot}(x, z) = \frac{1}{N_m} \sum_j P^{tot}(k_j, z) e^{-ik_j x}. \quad (4)$$

If a data vector, d, of length $N_d$, is defined that contains the total wavefield at the receiver locations of interest, its elements are given by $d_k = p^{tot}(x_k, z_k)$.

Vectors m and d may then be linked by the linear relationship (e.g., as at 406):

$$d = Gm \quad (5)$$

with the element of G given by:

$$G_{kj} = (e^{-iq_j z_k} \alpha e^{iq_j z_k}) e^{-ik_j x_k}. \quad (6)$$

To solve for m for a given d, the normal equations may be formed:

$$G'Gm = G'd \quad (7)$$

and the normal matrix may be inverted. The normal matrix has elements:

$$(G'G)_{jl} = (G')_{jk}(G)_{kl} = (G)_{kj}^*(G)_{kl} = (e^{iq_j z_k} \alpha e^{-iq_j z_k})(e^{-iq_l z_k} \alpha e^{iq_l z_k}) e^{i(k_j - k_l) x_k} \quad (8)$$

where the repeated index, k, is summed. The system may be rank-deficient, but it may be stabilized by adding a small amount of (frequency-dependent) damping to the main diagonal of the matrix:

$$m_{SSD} = (G'G + \epsilon I)^{-1} G' d. \quad (9)$$

Due to the relatively small size of this system, it may be practical to solve with a direct solver.

Once the plane-wave coefficients of the upgoing field at the free surface are known, the field may be re-datumed to any desired output datum and reconstructed at receiver locations. Because of the damping in the system, $Gm_{SSD} \neq d$, and any residual that cannot be projected through the ghost model, may be lost in the reconstructed field.

A further modification to SSD may include adding priors, so the εI matrix becomes a diagonal matrix, W, whose elements reflect the weighting (or prior) of the estimated upgoing wavefield as a function of the wavenumber/incidence angle. The diagonal matrix, W, may damp higher incidence angle components of the unknown upgoing wavefield. This may represent a trade-off between deghosting and artifact generation (e.g., over amplification of coherent noise with dip~water velocity). The diagonal matrix, W, may also be asymmetric and favor the components with "normal" dip. This may make the damping frequency and wavenumber dependent. The diagonal matrix, W, may also impact the extension to non-negative cross-line components discussed below.

Extension to Out-of-Plane Propagation

In order to account for out-of-plane propagation, the model space may be expanded to include components with non-zero cross-line wavenumbers as shown in Equation (10):

$$\tilde{m}_j = P^-(k^{(x)} = k_{j_x}^{(x)}, k^{(y)} = k_{j_y}^{(y)}, z=0). \quad (10)$$

The tilde notation indicates an expanded model space.

Following the same approach, the total wavefield at depth z, may be the sum of the upgoing and downgoing wavefields after backward and forward extrapolation respectively.

$$P^{tot}(k_{j_x}^{(x)}, k_{j_y}^{(y)}, z) = (e^{-i\tilde{q}_j z} \alpha e^{i\tilde{q}_j z}) P^-(k_{j_x}^{(x)}, k_{j_y}^{(y)}, 0), \quad (11)$$

where $\tilde{q}_j = \sqrt{\frac{\omega^2}{c^2} (k_{j_x}^{(x)})^2 (k_{j_y}^{(y)})^2}$.

This may be summed to extract the wavefield at y=0. The inline wavenumber axis may be integrated out:

$$p^{tot}(x, 0, z) = \frac{1}{N_m^x N_m^y} \sum_{j_x} \sum_{j_y} P^{tot}(k_{j_x}^{(x)}, k_{j_y}^{(y)}, z) e^{-ik_{j_x} x}. \quad (12)$$

Explicitly breaking out the non-zero crossline wavenumbers, this becomes:

$$p^{tot}(x, 0, z) = \frac{1}{N_m^x N_m^y} \left[ \sum_{j_x} P^{tot}(k_{j_x}^{(x)}, 0, z) e^{-ik_{j_x} x} + \sum_{j_x} \sum_{j_y, k_{j_y}^{(y)} \neq 0} P^{tot}(k_{j_x}^{(x)}, k_{j_y}^{(y)}, z) e^{-ik_{j_x} x} \right]. \quad (13)$$

The linear relationship (e.g., as built at 406) is now:

$$d = \tilde{G}\tilde{m}, \quad (14)$$

with elements given by:

$$\tilde{G}_{kj} = (e^{-i\tilde{q}_j z_k} \alpha e^{i\tilde{q}_j z_k}) e^{-ik_j x}. \quad (15)$$

Since this is an extended system, it may be rewritten as:

$$\tilde{m} = \begin{pmatrix} m \\ m_{ext} \end{pmatrix} \text{ and } \tilde{G} = (G \ G_{ext}), \quad (16)$$

where $m_{ext}$ and $G_{ext}$ contain the non-zero $k_y$ components of $\tilde{m}$ and $\tilde{G}$, which enables a constrained least-squares objective function to be written as:

$$\chi(\tilde{m}) = \left\| \begin{pmatrix} d \\ 0 \\ 0 \end{pmatrix} \begin{pmatrix} G & G_{ext} \\ \lambda I & 0 \\ 0 & \lambda \Lambda \end{pmatrix} \begin{pmatrix} m \\ m_{ext} \end{pmatrix} \right\|^2 \quad (17)$$

This is minimized in a LS sense by:

$$\tilde{m}_{soln} = \left[ \begin{pmatrix} G'G & G'G_{ext} \\ G'_{ext}G & G'_{ext}G_{ext} \end{pmatrix} + \lambda \begin{pmatrix} I & 0 \\ 0 & \Lambda^2 \end{pmatrix} \right]^{-1} \begin{pmatrix} G' \\ G'_{ext} \end{pmatrix} d \quad (18)$$

If a solution to the original system, $m_{soln}$, is known or determined, $$\begin{pmatrix} m_{soln} \\ 0 \end{pmatrix}$$

may be used as a starting solution to the extended system.

Choice of $k^{(y)}$ Sampling

Sampling theory may dictate that an appropriate wavenumber sampling is correlated with the length of the aperture in the spatial domain. For a single-streamer deghosting application, the cross-line aperture may be a single point, and so another criterion may be used.

In one embodiment, the user may define a maximum crossline angle of propagation, which together with the maximum inline angle of propagation, defines an ellipse in $k^{(x)} \ k^{(y)}$ space. For each $k^{(x)}$ that we have according to the sampling criterion, the maximum phase difference between primary and ghost events may be calculated, and the minimum number of plane-waves that to avoid cycle-skipping may also be calculated. The $k^{(y)}$ values may then be selected to regularly sample the maximum phase difference. This leads to the crossline wavenumber being more densely sampled at higher wavenumbers where the change in phase difference with respect to $k^{(y)}$ is greater.

Figure 5:
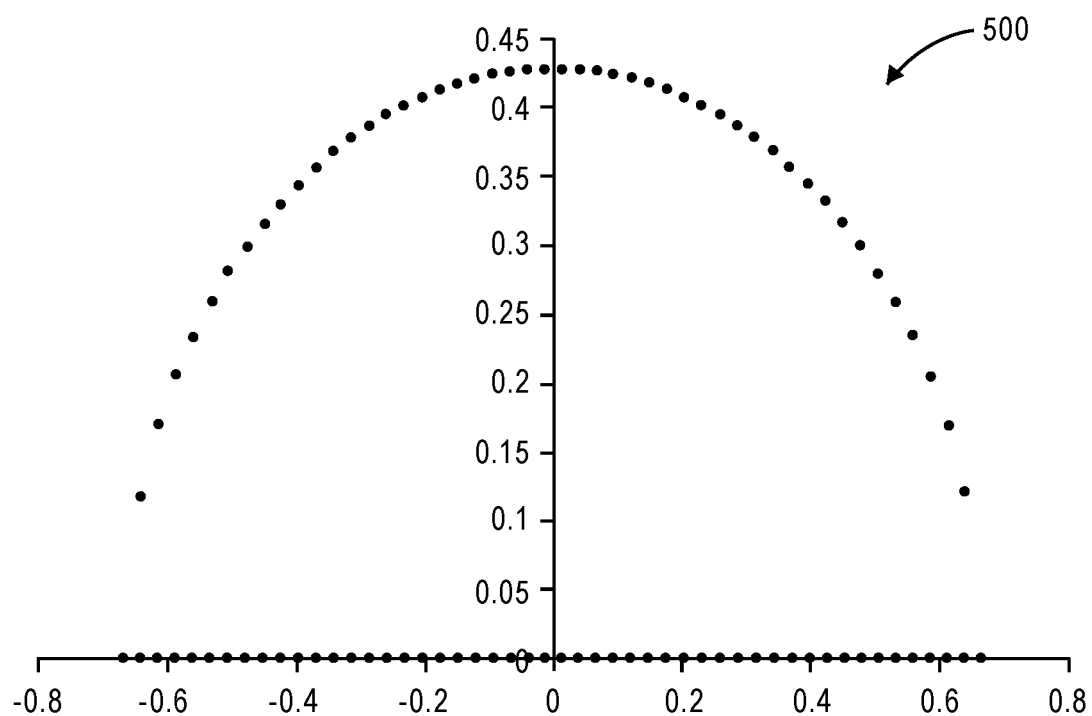
FIG. 5 illustrates a schematic view of wavenumber sampling in the $p^{(x)}$-$p^{(y)}$ plane, according to an embodiment.
Figure 6:
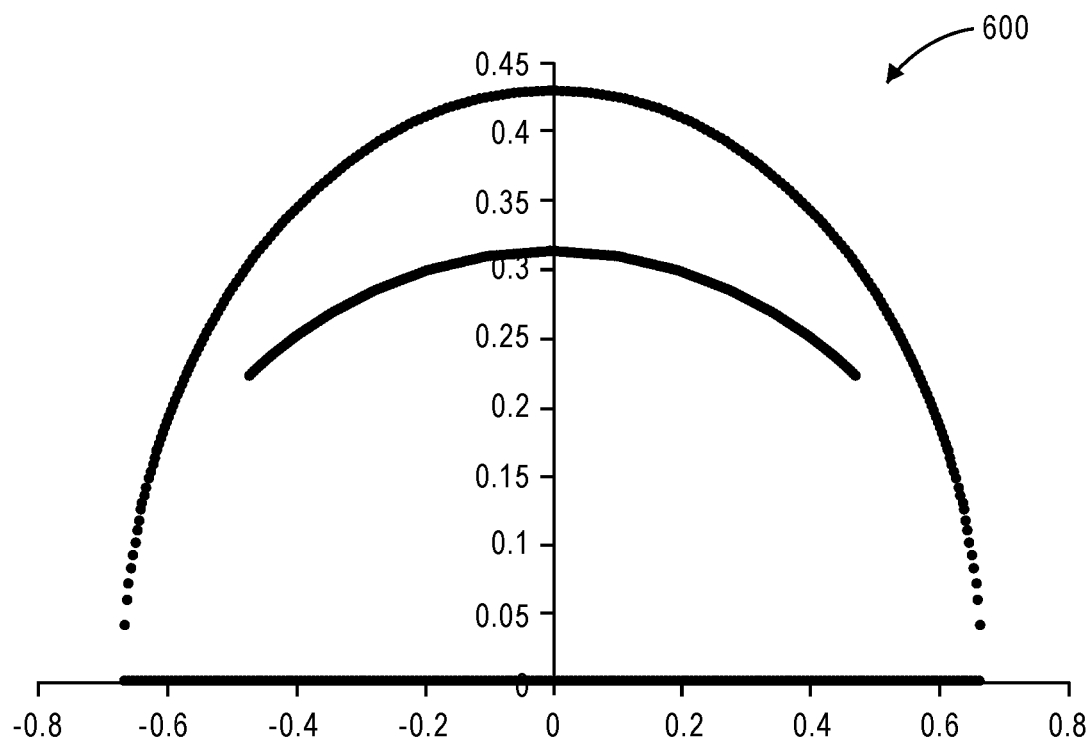
FIG. 6 illustrates a schematic view of a second wavenumber sampling pattern in the $p^{(x)}$-$p^{(y)}$ plane at higher frequency than FIG. 5, according to an embodiment.

FIG. 5 illustrates a schematic view of a graph 500 showing a wavenumber sampling in $p^{(x)} - p^{(y)}$ space (with axes normalized by frequency), where $$p^{(x)} = \frac{k^{(x)}}{\omega} \text{ and } p^{(y)} = \frac{k^{(y)}}{\omega},$$

and FIG. 6 illustrates a graph 600 of a similar sampling scheme, but for higher frequencies, according to an embodiment. In the examples shown in FIGS. 5 and 6, a maximum cable depth of 33 m, gives a ghost delay time of 44 ms for vertical propagation, and 34 ms for propagation angles of 40° crossline and 0° inline. At 70 Hz frequency, the Nyquist sample rate is 7.1 ms, so to sample the ghost operator for these angles and those between, three samples may be used: the first corresponding to $2zp_z = 44$ ms, which corresponds to $$p^{(y)} = \frac{k^{(y)}}{\omega} = 0;$$

the second at 39 ms, which corresponds to $p^{(y)} = 0.31$ s/km; and the final at 34 ms, which corresponds to $p^{(y)} = 0.42$ s/km. These points are visible in FIGS. 5 and 6, which show the $p^{(x)} - p^{(y)}$ (e.g., $k^{(x)} - k^{(y)}$) sampling for a streamer with 33 m maximum depth for 8 Hz (FIG. 5) and 70 Hz (FIG. 6). At low frequencies, just two crossline components are included for each $p^{(x)}$ (e.g., $k^{(x)}$) value; however, at higher frequencies the additional component is included for smaller $p^{(x)}$ (e.g., $k^{(x)}$) values. The number of crossline terms may have a direct impact on the cost of the matrix inversion, so crossline sampling may be minimized.

In order to avoid over-parameterization by the addition of the extra degrees of freedom, the basis coefficients for non-zero $k^{(y)}$ may be weighted by a factor $\beta^n$, where n is the order of the coefficient away from $k^{(y)} = 0$, and $\beta \approx 0.5$ is a constant. This defines the matrix, $\Lambda$.

Figure 7:
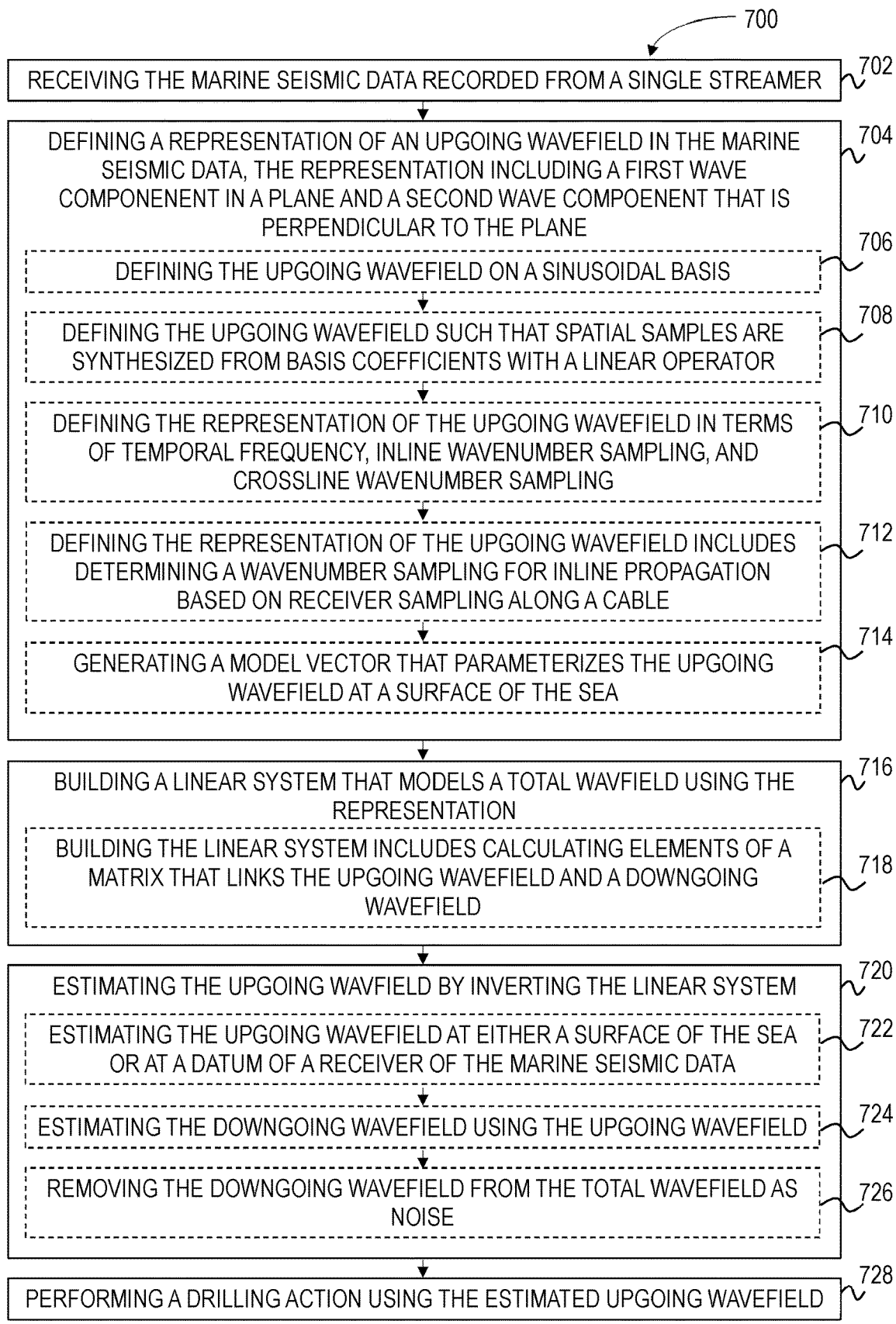
FIG. 7 illustrates another flowchart of a method for deghosting marine seismic streamer data, according to an embodiment.

FIG. 7 illustrates another flowchart of a method 700 for deghosting marine seismic streamer data, according to an embodiment. The method 700 may include receiving the marine seismic data recorded from a single streamer, as at 702. The method 700 may also include defining a representation of an upgoing wavefield in the marine seismic data, as at 704. The representation of the upgoing wavefield may include a first wave component in a plane and a second wave component that is perpendicular to the plane. The representation of the upgoing wavefield is defined on a sinusoidal basis, as at 706. The representation of the upgoing wavefield is defined such that spatial samples are synthesized from basis coefficients with a linear operator, as at 708. The representation of the upgoing wavefield is defined in terms of temporal frequency, inline wavenumber sampling, crossline wavenumber sampling, or a combination thereof, as at 710. Defining the representation of the upgoing wavefield includes determining a wavenumber sampling for inline propagation based on receiver sampling along a cable, and determining a crossline sampling such that a ghost delay is adequately sampled by the Nyquist criteria, as at 712. The method 700 may also include generating a model vector that parameterizes the upgoing wavefield at a surface of the sea, and the model vector parameterizes the upgoing wavefield in terms of one or more horizontal spatial Fourier components in a direction of the single streamer, as at 714.

The method 700 may also include building a linear system that models a total wavefield using the representation of the upgoing wavefield, as at 716. The total wavefield may include the upgoing wavefield and a downgoing ghost wavefield. Building the linear system includes calculating elements of a matrix that links the upgoing wavefield and the downgoing ghost wavefield, as at 718. The method 700 may also include estimating the upgoing wavefield, within the representation, by inverting the linear system, as at 720. The upgoing wavefield is estimated at either a surface of the sea or at a datum of a receiver of the marine seismic data, as at 722. The method 700 may also include estimating the downgoing ghost wavefield using the upgoing wavefield, as at 724, and removing the downgoing ghost wavefield from the total wavefield as noise, as at 726. The method 700 may also include performing a drilling action using the estimated upgoing wavefield or the total wavefield after the downgoing ghost wavefield (e.g., noise) has been removed, as at 728.

Figure 8:
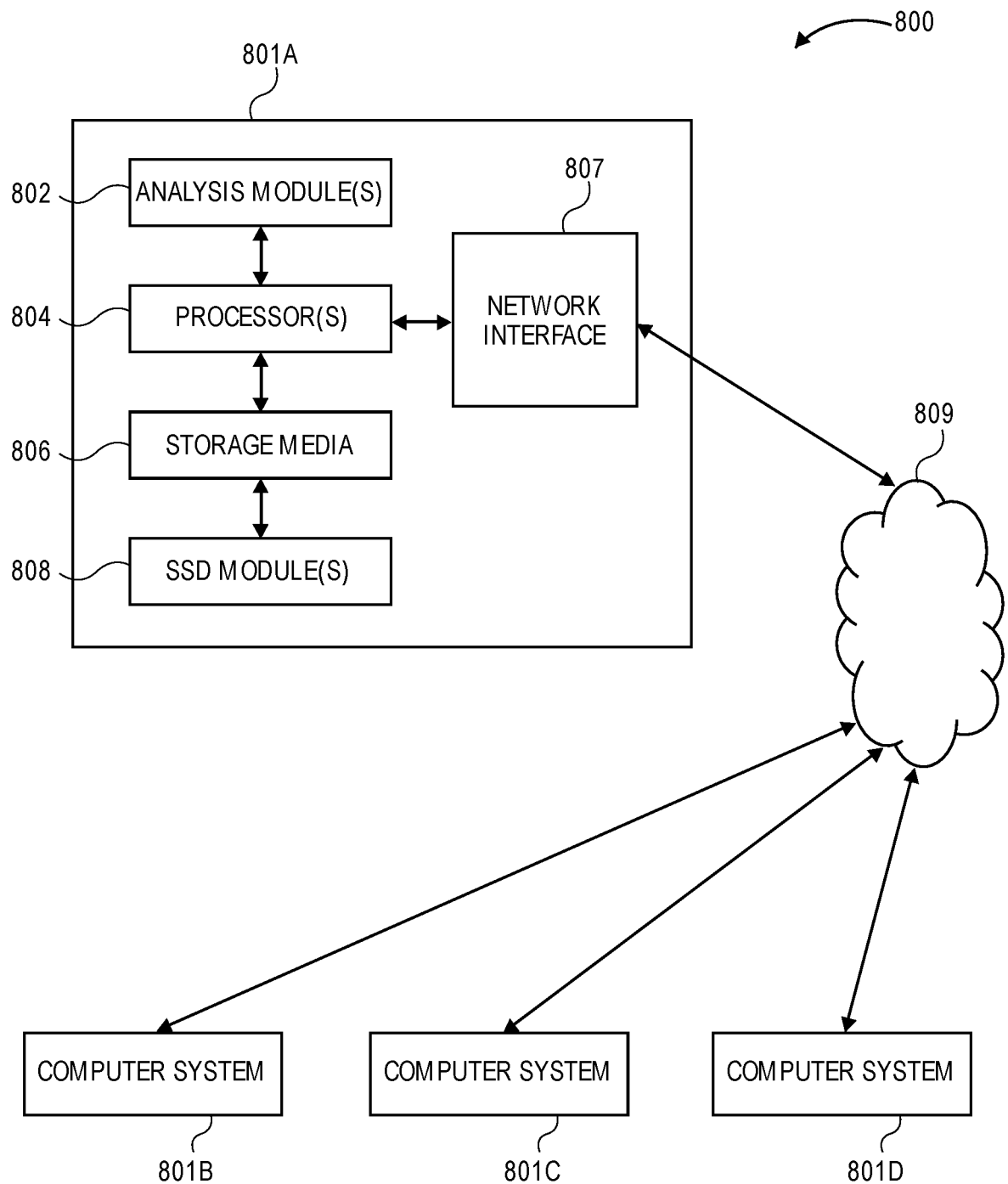
FIG. 8 illustrates a schematic view of a computing or processor system for performing the method, according to an embodiment.

In some embodiments, the methods of the present disclosure may be executed by a computing system. FIG. 8 illustrates an example of such a computing system 800, in accordance with some embodiments. The computing system 800 may include a computer or computer system 801A, which may be an individual computer system 801A or an arrangement of distributed computer systems. The computer system 801A includes one or more analysis modules 802 that are configured to perform various tasks according to some embodiments, such as one or more methods disclosed herein. To perform these various tasks, the analysis module 802 executes independently, or in coordination with, one or more processors 804, which is (or are) connected to one or more storage media 806. The processor(s) 804 is (or are) also connected to a network interface 807 to allow the computer system 801A to communicate over a data network 809 with one or more additional computer systems and/or computing systems, such as 801B, 801C, and/or 801D (note that computer systems 801B, 801C and/or 801D may or may not share the same architecture as computer system 801A, and may be located in different physical locations, e.g., computer systems 801A and 801B may be located in a processing facility, while in communication with one or more computer systems such as 801C and/or 801D that are located in one or more data centers, and/or located in varying countries on different continents).

A processor can include a microprocessor, microcontroller, processor module or subsystem, programmable integrated circuit, programmable gate array, or another control or computing device.

The storage media 806 can be implemented as one or more computer-readable or machine-readable storage media. Note that while in some example embodiments of FIG. 8 storage media 806 is depicted as within computer system 801A, in some embodiments, storage media 806 may be distributed within and/or across multiple internal and/or external enclosures of computing system 801A and/or additional computing systems. Storage media 806 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 800 contains one or more SSD module(s) 808. In the example of computing system 800, computer system 801A includes the SSD module 808. In some embodiments, a single SSD module may be used to perform at least some aspects of one or more embodiments of the methods disclosed herein. In alternate embodiments, a plurality of SSD modules may be used to perform at least some aspects of methods disclosed herein.

It should be appreciated that computing system 800 is but one example of a computing system, and that computing system 800 may have more or fewer components than shown, may combine additional components not depicted in the example embodiment of FIG. 8, and/or computing system 800 may have a different configuration or arrangement of the components depicted in FIG. 8. The various components shown in FIG. 8 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection of the invention.

Geologic interpretations, models and/or other interpretation aids may be refined in an iterative fashion; this concept is applicable to methods as discussed herein. This can include use of feedback loops executed on an algorithmic basis, such as at a computing device (e.g., computing system 800, FIG. 8), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated. Additional information supporting the disclosure is contained in the appendix attached hereto.

What is claimed is:

1. A method for deghosting marine seismic streamer data, comprising:
  receiving marine seismic data recorded from only one streamer;
  defining a representation of an upgoing wavefield of a line of pressure measurements along the one streamer in the marine seismic data, wherein the representation comprises a first wave component in a plane corresponding to the line of pressure measurements and a second wave component that is perpendicular to the plane, wherein the representation defines a portion of an ellipse in a $k^{(x)}$–$k^{(y)}$ space of the first wave component and the second wave component, wherein a $k^{(x)}$ value defines a corresponding maximum $k^{(y)}$ value, and wherein a maximum phase difference between primary and ghost events of the upgoing wavefield and a downgoing ghost wavefield depends on the maximum $k^{(y)}$ value;

building a linear system that models a wavefield using the representation, wherein the wavefield comprises the upgoing wavefield and the downgoing ghost wavefield; and estimating the upgoing wavefield by inverting the linear system.

2. The method of claim 1, wherein the representation of the upgoing wavefield is defined on a sinusoidal basis.

3. The method of claim 2, wherein the representation of the upgoing wavefield is defined such that spatial samples are synthesized from basis coefficients with a linear operator.

4. The method of claim 1, wherein the representation of the upgoing wavefield is defined in terms of temporal frequency, inline wavenumber sampling, and crossline wavenumber sampling, wherein the inline wavenumber sampling corresponds to values of $k^{(x)}$ and the crossline wavenumber sampling corresponds to values of $k^{(y)}$.

5. The method of claim 1, wherein defining the representation of the upgoing wavefield comprises:
determining a wavenumber sampling for inline propagation based on receiver sampling along the one streamer; and
determining a crossline sampling such that a ghost delay is adequately sampled by the Nyquist criteria.

6. The method of claim 1, further comprising generating a model vector that parameterizes the upgoing wavefield at a surface of the sea, wherein the model vector parameterizes the upgoing wavefield in terms of one or more horizontal spatial Fourier components in a direction of the one streamer.

7. The method of claim 1, wherein building the linear system comprises calculating elements of a matrix that links the upgoing wavefield and the downgoing ghost wavefield.

8. The method of claim 1, further comprising:
estimating the downgoing ghost wavefield using the upgoing wavefield; and
removing the downgoing ghost wavefield from the wavefield as noise.

9. The method of claim 1, wherein the upgoing wavefield is estimated at either a surface of the sea or at a datum of a receiver of the marine seismic data.

10. The method of claim 1, further comprising performing a drilling action using the estimated upgoing wavefield.

11. A non-transitory computer-readable medium storing instructions that, when executed by one or more processors of a computing system, cause the computing system to perform operations, the operations comprising:
receiving marine seismic data recorded from only one streamer;
defining a representation of an upgoing wavefield of a line of pressure measurements along the one streamer in the marine seismic data, wherein the representation comprises a first wave component in a plane corresponding to the line of pressure measurements and a second wave component that is perpendicular to the plane, wherein the representation defines a portion of an ellipse in a $k^{(x)}$–$k^{(y)}$ space of the first wave component and the second wave component, wherein a $k^{(x)}$ value defines a corresponding maximum $k^{(y)}$ value, and wherein a maximum phase difference between primary and ghost events of the upgoing wavefield and a downgoing ghost wavefield depends on the maximum $k^{(y)}$ value;
building a linear system that models a wavefield using the representation, wherein the wavefield comprises the upgoing wavefield and the downgoing ghost wavefield; and
estimating the upgoing wavefield by inverting the linear system.

12. The non-transitory computer-readable medium of claim 11, wherein the representation of the upgoing wavefield is defined on a sinusoidal basis.

13. The non-transitory computer-readable medium of claim 11, wherein the representation of the upgoing wavefield is defined such that spatial samples are synthesized from basis coefficients with a linear operator.

14. The non-transitory computer-readable medium of claim 11, wherein the representation of the upgoing wavefield is defined in terms of temporal frequency, inline wavenumber sampling, and crossline wavenumber sampling, wherein the inline wavenumber sampling corresponds to values of $k^{(x)}$ and the crossline wavenumber sampling corresponds to values of $k^{(y)}$.

15. The non-transitory computer-readable medium of claim 11, wherein defining the representation of the upgoing wavefield comprises:
determining a wavenumber sampling for inline propagation based on receiver sampling along the one streamer; and
determining a crossline sampling such that a ghost delay is adequately sampled by the Nyquist criteria.

16. The non-transitory computer-readable medium of claim 11, further comprising generating a model vector that parameterizes the upgoing wavefield at a surface of the sea, wherein the model vector parameterizes the upgoing wavefield in terms of one or more horizontal spatial Fourier components in a direction of the one streamer.

17. A computing system, comprising:
one or more processors; and
a memory system comprising one or more non-transitory computer-readable media storing instructions that, when executed by at least one of the one or more processors, cause the computing system to perform operations, the operations comprising:
receiving marine seismic data recorded from only one streamer;
defining a representation of an upgoing wavefield of a line of pressure measurements along the one streamer in the marine seismic data, wherein the representation comprises a first wave component in a plane corresponding to the line of pressure measurements and a second wave component that is perpendicular to the plane, wherein the representation defines a portion of an ellipse in a $k^{(x)}$–$k^{(y)}$ space of the first wave component and the second wave component, wherein a $k^{(x)}$ value defines a corresponding maximum $k^{(y)}$ value, and wherein a maximum phase difference between primary and ghost events of the upgoing wavefield and a downgoing ghost wavefield depends on the maximum $k^{(y)}$ value;
building a linear system that models a wavefield using the representation, wherein the wavefield comprises the upgoing wavefield and the downgoing ghost wavefield; and
estimating the upgoing wavefield by inverting the linear system.

18. The computing system of claim 17, wherein building the linear system comprises calculating elements of a matrix that links the upgoing wavefield and the downgoing ghost wavefield.

19. The computing system of claim 17, wherein the operations further comprise:
   estimating the downgoing ghost wavefield using the upgoing wavefield; and
   removing the downgoing ghost wavefield from the wavefield as noise.

20. The computing system of claim 17, wherein the upgoing wavefield is estimated at either a surface of the sea or at a datum of a receiver of the marine seismic data.

* * * * *